Dec. 26, 1933.  A. W. SCHORGER  1,941,278
MANUFACTURE OF ETHER DERIVATIVES OF CARBOHYDRATES LIKE CELLULOSE
Original Filed Aug. 14, 1930
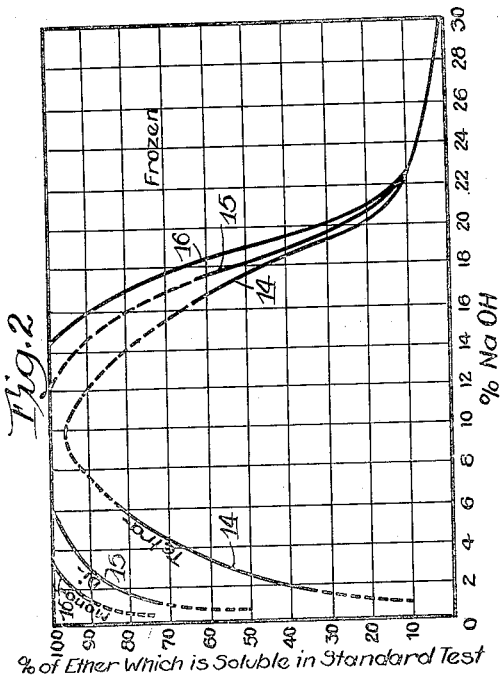
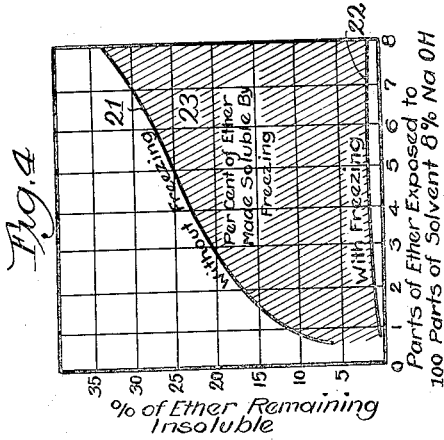
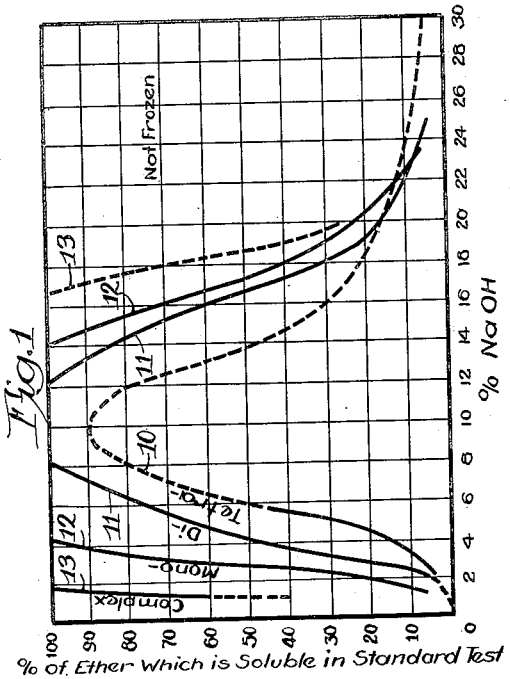
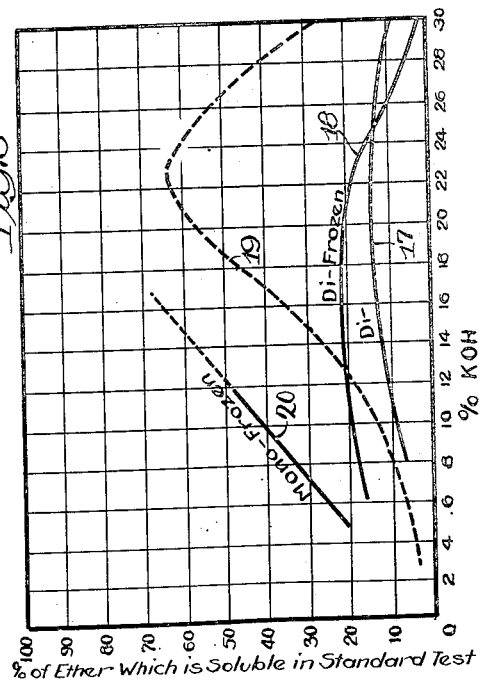
Inventor,
Arlie W. Schorger Patented Dec. 26, 1933

1,941,278

UNITED STATES PATENT OFFICE 1,941,278

MANUFACTURE OF ETHER DERIVATIVES OF CARBOHYDRATES LIKE CELLULOSE

Arlie W. Schorger, Madison, Wis., assignor to C. F. Burgess Laboratories, Inc., Madison, Wis., a corporation of Delaware Original application August 14, 1930, Serial No. 475,249. Divided and this application August 25, 1930. Serial No. 477,753

20 Claims. (Cl. 260—152)

This invention relates to new carbohydrate derivatives, especially cellulose derivatives, and methods for making them. It relates more particularly to the hydroxy-alphyl ethers of cellulose and especially those hydroxy-alphyl ethers in which substantially less than one hydroxy hydrogen atom in each cellulose unit is replaced by an alphyl radical, and especially such compounds of this composition which are of limited solubility in caustic soda solutions and are practically insoluble in caustic potash solutions. This invention relates also to an improved method for making such derivatives whereby an olefine oxide containing an ethylene oxide group react with moist alkali carbohydrate and especially moist alkali cellulose. Some of the products possess physical properties and characteristics suitable for the production of water-resistant, highly transparent films and filaments, plastic mixtures, insulating goods, finishing materials, etc. Other forms are suitable for sizes, adhesives, filler for adhesives, etc. My new process permits of the production of valuable intermediate forms of products as will be explained hereinafter.

The raw materials suitable for my product and process include the following: carbohydrates such as cane sugar, starch, glucose, cellulose of all kinds, materials containing cellulose, hydrated or hydrolyzed cellulose, raw or purified viscose (cellulose partially or completely xanthated) before or after its spontaneous decomposition, other "recovered" celluloses, and some derivatives of cellulose, such as partially esterified, alkylated, or etherified cellulose, and suitable conversion products of cellulose which are as little degraded or depolymerized as possible.

My etherifying agent is essentially a compound containing an ethylene oxide structure. It may be ethylene oxide as such or any of the olefine homologs, such as propylene oxide, butylene oxide, amylene oxide or the higher homologs which may be reactive oxides. Mixtures of these oxides may be used. The chlorhydrins corresponding to these oxides may also be used in my process to make the derivatives of my invention. Other chlorhydrins forming hydroxy-alphyl ethers as enumerated in the following specification also may be used.

It has been found that the higher the number of carbon atoms in the reactive etherifying compound the more difficult it is to effect the reaction, that is, more heat and time are required, so that the products and process are practically limited to the compounds corresponding to the homologs at the lower end of the olefine series.

Briefly, the process consists in treating the carbohydrate substance with caustic alkali solution and subjecting the resulting alkali carbohydrate to direct contact with the etherifying agent, that is, the olefine oxide, or a chlorhydrin corresponding to such oxide. These operations usually result in an impure form of the desired carbohydrate compound. In practice, optional subsequent operations may be performed to purify the product and produce it in forms which are technically more useful.

It has been known that carbohydrates such as starch and cellulose combine directly with ethylene oxide to form compounds which may be ethers, but which apparently are constituted somewhat differently than when made by my method. The methods which have been used for their preparation are such that the products have little or no commercial value because of various difficulties encountered in the process and their excessive cost. Furthermore, the products themselves are of such a nature that they apparently have little practical application. For instance, if one part of cotton linters is treated with 10 parts ethylene oxide at 100° C. for 10 hours a reaction probably occurs since the cotton linters seem to gain slightly in weight, but the resulting product appears to be only a more reactive form of cellulose which is insoluble in a dilute caustic soda solution. On the other hand, by my process, if sufficient of the oxide reacts with alkali cellulose at room temperatures a product is formed immediately, which is completely soluble in 10% caustic soda solution; or in case the amount of ethylene oxide is insufficient so that a small amount of reaction product is insoluble in the caustic soda solution, practically complete apparent solubility usually can be obtained by freezing the reaction product with a dilute caustic soda solution. Apparently the caustic alkali serves as a catalyst in promoting the reaction between the cellulose and olefine oxide.

Although the ethers of this invention are described as being partially soluble in caustic alkali solutions they form at least in part so-called colloidal solutions therewith as they apparently do not form true solutions. The ethers are dispersed by the caustic alkali, which is the peptizing agent. Throughout the application and claims when a solution of the ether in caustic alkali solutions is referred to, it indicates a solution which may be partially or wholly colloidal.

I have found that it is possible to produce a reaction between carbohydrates, for example, cellulose, and ethylene oxide and/or some of its homologs at room temperatures almost instantaneously, if the carbohydrate is first treated with caustic alkali, presumably to form an alkali compound therewith. The ethylene oxide or homologous oxide, preferably in gaseous form, is then brought into contact with the resulting alkali compound, preferably at room temperatures. An exothermic reaction results which is vigorous, especially if the alkali compound is wet. By the term "wet" I have reference to a material containing the amount of liquid which remains after squeezing, wringing, or centrifuging out the excess liquid resulting from soaking the material in water or a water solution of a chemical such as caustic soda. No excess of oxide is needed as the reaction is practically quantitative. If insufficient oxide is added so that some of the reaction product remains insoluble in an aqueous caustic soda solution at room temperature it is necessary only to freeze the product in the caustic solution to obtain practically complete apparent solubility. Products made by reacting alkali cellulose with such oxides in proportions comparable to those heretofore made by direct union of the oxide and cellulose have different properties indicating that specific methods of manufacture may determine specific properties in the product to meet the various uses to which the product may be put.

Although hydroxy-alphyl ethers of cellulose similar to those which I have discovered have been known and described, those ethers have contained at least one hydroxy-alphyl radical per cellulose unit. Those ethers were not of limited solubility in aqueous caustic alkali solutions. Such prior hydroxy-ethers of cellulose have been produced by the action of chlorhydrins such as ethylene chlorhydrin, propylene chlorhydrin and glycerol chlorhydrins on alkali cellulose with subsequent purification operations if a pure product was desired. I have found that with my improved method, I can use these same chlorhydrins to produce alphyl-hydroxy ethers of cellulose containing substantially less than one replaced hydroxyl hydrogen atom per cellulose unit and which are soluble in a 10% caustic soda solution but which are practically insoluble or slightly soluble in a corresponding caustic potash solution and also are limited in their solubility in dilute caustic soda solutions of other concentrations. With my method it is possible to make these derivatives in pure form without using purification operations as had been previously found necessary. My improved method of reacting the alkali cellulose with the olefine oxide, especially ethylene and propylene oxides, to produce both the hydroxy-alphyl ethers of cellulose containing less than one replaced hydroxyl hydrogen atom and those containing more than one replaced hydroxyl hydrogen atom per cellulose unit, has advantages over the chlorhydrin method.

When making cellulose compounds embodying this invention, the original cellulose material, as hereinbefore described, may be used in the dry, air dry, moist or wet condition. It is first mercerized by steeping it for a suitable length of time, such as from one to ten minutes at room temperature or slightly above, in a caustic alkali solution such as a caustic soda solution, which may range from 14% to 60% in strength but preferably contains substantially less than 50% caustic soda. The mercerizing action is almost instantaneous. An equivalent caustic potash solution may be used. When using cellulose which is not dry, the quantity of water present may advantageously be considered when making up the caustic alkali solution. The caustic soda solution itself absorbs small amounts of etherifying agent. It has been found that a 30% caustic soda solution absorbs less ethylene oxide and homologous oxides than weaker caustic soda solutions, whereas caustic soda solutions stronger than 30% leave an excess of caustic soda in the product which may be wasted in the subsequent operation. For example, I may use approximately 15 parts by weight of caustic soda solution to one part of cellulose. The mixture may be gently agitated to insure uniform mercerization. As the caustic soda in the solution present increases above 50%, the subsequent etherifying action is slower. Not only does the increased quantity of caustic soda present appear to slow down the reaction, but also an excessive amount of water has the same apparent effect. Therefore, I prefer to limit the water present, yet to provide a caustic soda solution which does not contain more than 50% of alkali, and in consequence, employ an alkali cellulose for etherification which is merely wet with a solution of the desired strength and preferably of 30% strength.

After mercerization is complete, the excess caustic soda solution is eliminated by pressure, centrifugal action, or any other suitable method until the cellulose content of the mixture has increased to at least 20%, and preferably to between 25% and 35%. I prefer to call the resulting material a "wet" alkali cellulose. The etherifying agent is then brought into intimate contact with the wet alkali cellulose and the proportion of the reacting constituents is carefully regulated. Although any of the etherifying agents and cellulosic materials heretofore mentioned may be used, for purposes of illustration I first will describe in detail a process employing ethylene oxide and cotton linters or some other form of high grade alpha cellulose, and one in which refrigeration is not necessary. Those skilled in the art may readily adapt the following procedure to other cellulosic materials. Degradation of the cellulose through excessive ageing of the alkali cellulose tends to make the etherified product water soluble and therefore must be avoided where water insoluble products are desired. Throughout the specification, when cellulose or alkali cellulose is referred to, it is understood that the cellulose has not been degraded sufficiently, unless such degradation is mentioned specifically, to increase the solubility of the resulting ether beyond the limits set for such solubility in caustic alkali solution.

Under ordinary conditions of room temperature (20° C.) and atmospheric pressure, ethylene oxide (boiling at about 10.7° C.) is a vapor. It is usually stored and shipped under pressure in metal cylinders. It may be conducted as a vapor directly from such cylinders to a suitable gas tight reaction chamber containing alkali cellulose, the rate of flow being regulated in consideration of the rate of absorption by the alkali cellulose. To regulate the quantity of ethylene oxide used the cylinder may be supported upon weighing apparatus suitable for indicating its decrease in weight. The ethylene oxide vapor also may be conducted directly to the alkali cellulose from an oxide generating chamber or it may be generated in the alkali cellulose reaction chamber if desirable. Evacuation of the reaction chamber prior to the introduction of the oxide is desirable since it hastens the reaction and results in a more uniform etherification. Ethylene oxide is introduced into the reaction chamber at a rate somewhat in excess of the rate of absorption and after a sufficient quantity has been introduced, the flow is stopped. The mixture is agitated during all this time and agitation is continued until absorption to the extent desired is practically complete.

The etherifying reaction is exothermic and cooling may be necessary to prevent charring of the cellulose. I prefer to maintain the temperature of the reacting mixture below 45° C. The agitation of the mixture also prevents local over-heating. It is not necessary, however, to keep the temperature below the 45° C. specified since it only is necessary to avoid charring, which does not take place until a considerably higher temperature (about 100° C.) is reached. Stirring also ensures that the ethylene oxide will reach all of the alkali cellulose. The etherifying operation may be continued until the supplied quantity of ethylene oxide is absorbed. Where it is not desirable to refrigerate the resulting ether to secure practically complete solubility in dilute caustic soda solutions it is necessary to react about 11% to 20% or more of ethylene oxide (based on the cellulose in the alkali cellulose) with the alkali cellulose. If the refrigeration is practiced the larger amount of ethylene oxide may be reduced. A high grade cellulose such as cotton linters requires a larger amount of ethylene oxide to secure complete solubility than a highly purified cellulose made from wood pulp, the latter apparently being less resistant chemically.

The product obtained by the process outlined hereinabove probably is an impure ether of cellulose and ethylene oxide having a glycol structure, one impurity being the caustic alkali which, although present to ensure success of the process, probably does not enter into the reaction directly and, after the reaction is complete, remains as an impurity. Where about 14% to 15% of ethylene oxide based on the cellulose content is supplied and absorbed it is probable that two units of cellulose are combined with each molecule of ethylene oxide; hence the probable appropriate chemical designation is ethyleneglycol(di)cellulose or dicellulosehydroxyethyl ether. A unit of cellulose is here defined as $C_6H_{10}O_5$.

Theoretically the ethylene oxide content of the dicellulosehydroxyethyl ether as represented by the formula below is 13.6% of the cellulose content. When less than 15% of ethylene oxide is used the reaction between the alkali cellulose made from cotton linters or other form of high-grade alpha cellulose and the ethylene oxide at about 0° C. must be carefully controlled so that only a small amount of residue insoluble in a dilute caustic soda solution remains. Under the most carefully controlled conditions I have made a compound with 11% to 12% added ethylene oxide which was practically totally soluble (to the eye) in a 10% caustic soda solution. Even under these conditions the microscope shows that the compound may not be entirely dispersed and the ether may not be suitable for the highest grade products where a high degree of transparency is desirable. Under ordinary conditions of reaction it is necessary to supply about 18% to 20% of ethylene oxide for complete solubility (using a high-grade cellulose) in dilute caustic soda solution, provided the reaction product is not subjected to a temperature below freezing in the presence of the caustic soda solution. It is possible that some of the cellulose units may absorb more or less than the calculated amount of oxide. Furthermore, the ethylene oxide may form a limited amount of ethylene glycol or diethylene oxide. These facts may account for a measured absorption in excess of theoretical predictions. When more than the preferred amount is used there may be waste and the quality of the product is injured for certain purposes as will be explained hereinafter. The properties of the product vary with the amount of ethylene oxide absorbed which may be as high as 200%.

It is believed that under the above reaction conditions the union of the cellulose and ethylene oxide is effected by the substitution of the ethylene oxide radical for the hydrogen atom of hydroxyl groups (preferably primary) of a cellulose unit or of two or more linked cellulose units whereby one valence of the oxygen atom of the oxide is replaced by an hydroxyl hydrogen atom of the cellulose molecule to form an hydroxyl group attached to the ethylene radical. It is believed that the reaction for the dicellulose ether takes place as follows:

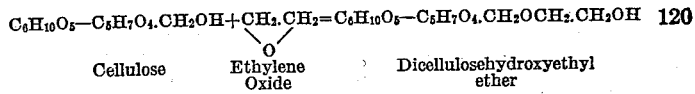

| Cellulose | Ethylene Oxide | Dicellulosehydroxyethyl ether |

The foregoing illustrates the reaction on a primary hydroxyl group. More generically expressed, the reaction is undoubtedly

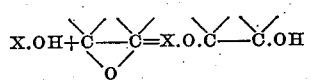

where $X.OH$ represents the carbohydrate or its derivative.

The reaction for other carbohydrates such as starch, sugars, glucose, etc. probably takes place in a similar manner. When more ethylene oxide is absorbed than that shown by the above equation it is probable that the oxide replaces hydrogens in additional hydroxyl groups of the carbohydrates or it forms chain compounds with the hydroxyl of the added ethylene radical. Thus in further reaction it is possible that two different products are formed or a mixture of two different products are formed. In the refrigeration method to be hereinafter more fully described, it is probable that one ethylene oxide molecule or hydroxy-alphyl radical combines with aggregates consisting of four cellulose units. The aggregate suffers less degradation when less oxide or alphyl radical is added.

If acidified and then washed free of the resulting salts and remaining acids after such operations as have been described, the products retain the physical form and megascopic structure of the material from which it is derived, that is, in this case, the fibrous structure of cotton linters or other alpha cellulose. After washing, it may be dried and shipped in such fibrous form or it may be stored indefinitely without deterioration. In this form it is light, fluffy, and very easily handled. The dicellulose compound and those compounds containing a greater proportion of cellulose are insoluble in water, alcohol, and a brine comprising a saturated solution of sodium sulphate slightly acidified with sulphuric acid. The ethers of my invention differ from the ethers made previously and described in the literature and patents with respect to their solubility in caustic alkalies. My ethers made by absorption of less than 20% of ethylene oxide by the soda cellulose, based on the weight of the cellulose, are only partially soluble (less than 95%) in solutions containing more than 20% of caustic soda and in practically all strengths of caustic potash solutions. If less than 5% of the ether is insoluble it is regarded as substantially soluble. These ethers likewise are only partially soluble in caustic soda solutions containing less than from 2% to 6% of caustic soda, the ethers higher in ethylene oxide content being more soluble in the weaker caustic soda solutions. The reverse is true when the caustic soda solutions are in the range between 15% and 20%. The greatest solubility seems to be in 5% to 15% solutions of caustic soda with the maximum at about 10%. These same ethers containing up to about 20% of added ethylene oxide are but partially soluble in caustic potash solutions of any strength. Of these ethers, those containing from 13% to 14% to about 20% of added oxide, though only partially soluble, show the largest solubility of any of my ethers in caustic potash solutions of about 15% to 20% concentration, although most of them are less than 50% soluble. The ether solubility or dispersion in a caustic alkali solution apparently increases more or less directly with the concentration of the etherifying agent. However, the solubility or dispersion of the ether may vary over a wire range in a small range of caustic alkali concentration as is shown in the accompanying solubility curves. At about an 8% ether concentration the clear solution is highly viscous so that solutions of much above that concentration are of little interest.

The solubilities given above and as defined for the claims are based on measurements made at room temperatures and on both dry and moist ethers made from alkali celluloses in which the cellulose has not been subjected to the action of caustic alkalies for an excessive length of time, that is, the cellulose has not suffered enough degradation to make the resulting ethers appreciably more soluble. Alpha cellulose derived from wood pulp is the basic cellulosic material. The solubilities are determined by exposing the dry or wet precipitated ether to the action of the caustic alkali solution for 24 hours at room temperature, the weight of ether conveniently being 2% of the solution weight. The solution is then centrifuged in an ordinary laboratory centrifuge. The solids thrown out of solution are washed by further centrifuging, thrown into a coagulating bath (alcohol-acetic acid mixture), filtered, dried, and weighed. That portion of the ether which is thrown out of solution since it is not sufficiently dispersed to form a clear (to the eye) colloidal suspension or solution is regarded as not soluble since such undissolved ether can not be tolerated commercially where clear solutions are required. For special purposes a greater degree of dispersion may be required. The ether apparently disperses to varying particle sizes according to its concentration in the caustic alkali solutions. It disperses to a finer state of division, therefore indicating a higher solubility, the lower its ratio to the solution. The greater the dispersion the smaller the amount of ether which is thrown out by centrifuging and the higher the apparent solubility. I have accordingly used a low ether concentration when determining the solubility thereof since solutions of such low concentration are below those of any commercial importance, and, furthermore, a limited solubility of the ether in such concentrations indicates a much lower solubility in those concentrations of commercial importance. The solutions of low ether concentration are also less viscous and more amenable to the necessary manipulations.

The ethers should be substantially soluble in dilute caustic soda solutions if they are to be used directly and are to be of any commercial importance where transparency and freedom from insolubles is required. Practically all commercial solutions are viscous and 5% of insoluble ether in such a viscous solution prevents it from being filtered to remove any considerable amount of insoluble matter or otherwise manipulated effectively. For instance, if the ether is not sufficiently soluble in caustic alkali solutions, a film made therefrom is not clear and transparent, or if the soluble portion is filtered off after diluting the solution sufficiently to make it filterable, it does not form a usable film because of the low ether concentration. Such low concentration solutions also cannot be used for making imitation silk fibers. A film made for commercial purposes should have a thickness of about .001 inch when dry. A solution containing at least 5% of the ether is usually required to make a satisfactory film. The solution should be practically clear to the eye though it may even then contain insufficiently dispersed cellulose compounds which may prevent the making of a high grade product. The solubility of the ether in caustic alkali solutions may be increased by freezing it in the presence of caustic alkalies provided that the ether is subjected to the action of the solvent caustic alkali directly after freezing, that is, the ether is not precipitated out of the alkali after the freezing operation. The freezing operation disperses the ether more effectively and clear solutions are obtained more easily.

Whenever dilute caustic alkali solutions are mentioned in this specification they relate specifically to solutions containing from 2% to 25% of caustic alkali and sometimes may refer to solutions containing from 5% to 15% caustic alkali, especially in connection with caustic soda solutions.

Not only is the product containing a lower amount of ethylene oxide less soluble in dilute caustic alkali solutions but it is also cheaper to make because of the relatively high cost of the etherifying agent. It also has superior properties for many purposes. As hereinbefore described, the product formed by the absorption of less than about 11% to 15% of ethylene oxide generally does not form a clear solution when dissolved in a dilute caustic soda solution due to the incomplete solubility of the reaction product. This residual insoluble reaction product in the dissolved ether is objectionable for most purposes and must be removed. I have discovered that it may be made more soluble or entirely soluble by a suitable freezing operation. It is practically impossible to filter this insoluble product (usually gelatinous fibers) from the viscous solutions of the ether in caustic soda which are required in the arts, and therefore other methods must be used.

In the accompanying drawing:

Fig. 1 illustrates the apparent solubility of a series of ethers in caustic soda solutions;

Fig. 2 illustrates the increased solubilities over those in Fig. 1 produced by the freezing process of this invention;

Fig. 3 illustrates the apparent solubilities of a series of ethers in caustic potash solutions;

Fig. 4 illustrates specifically the effect of freezing to increase solubility.

I do not intend to bind myself closely to the properties of the ethers as indicated by the curves in the figures, since the properties are variable and are determined by the various factors herein described. The curves are given only to illustrate properties graphically for visualizing the numerous general statements herein made, and to permit one to recognize the direction in which the properties change with changes in the process.

The data for curves which appear in full lines have been rather quantitatively found to locate the same on the chart. The dotted line curves are predicated on many qualitative observations, and considerable experinece within the ranges covered, and represent generally what I believe to exist.

In Fig. 1, the curves are derived, as by a standardized test, by subjecting two parts by weight of an ether containing various amounts of ethylene oxide to solution in 100 parts by weight of various strengths of caustic soda. The percent of the exposed ether which is dissolved or dispersed in the caustic soda is plotted vertically against the strength of the caustic soda solution. Curve 10 corresponds to the tetra-cellulose ether, containing about 6.8% ethylene oxide. Curve 11 corresponds to a dicellulose ether containing about 13.6% ethylene oxide. Curve 12 corresponds to a mono-cellulose ether containing 27.2% ethylene oxide. Curve 13 corresponds to a more complex ether containing 40.4% ethylene oxide.

Fig. 2 is derived in the same way as the curves in Fig. 1, but the product was frozen, as elsewhere described, to increase the solubility. Curves 14, 15 and 16 correspond respectively to the materials of curves 10, 11 and 12 of Fig. 1. The two figures show the increase in solubility which is most notable in the more dilute caustic soda solutions.

Fig. 3 relates to caustic potash solutions and indicates the lessened solubility therein. Curve 17 represents a dicellulose ether without freezing, and curve 18 indicates the increase over 17 by freezing the product. Likewise, curves 19 and 20 indicate respectively the relative solubilities of a mono-cellulose ether, unfrozen and frozen.

In Fig. 4 two curves are shown based upon the following table of data:

*Solubility of an ether containing 8% ethylene oxide in caustic alkali solutions*

| Parts ether exposed to 100 parts solvent | 8% NaOH | | KOH | | | |
| --- | --- | --- | --- | --- | --- | --- |
| | | | 8%* | | 15% | |
| | Without freezing | With freezing | Without freezing | With freezing | Without freezing | With freezing |
| 0.5 | 6.24 | | | | 90.52 | |
| 1.0 | 11.60 | 0.42 | | | 92.00 | 23.1 |
| 2.0 | 18.18 | | 65.64 | | 93.88 | |
| 4.0 | 18.59 | 0.70 | | | | |
| 6.0 | 26.88 | | | | | |
| 8.0 | 34.10 | 1.20 | 87.25 | | 94.72 | |

*The ether was practically entirely insoluble at room temperature in 8% KOH.

Curve 21 represents the amount of undissolved ether at the various concentrations when solution is effected without freezing. When the same solution is frozen, as herein described, the insoluble portion is substantially all rendered soluble over the range indicated. The curve 22 represents the small amounts found undissolved after freezing. The shaded area 23 therefore represents graphically the advantage of the freezing process.

The low partial solubility of my ethers in caustic potash solutions is also of further technical importance. If cellulose is mercerized with caustic potash and then etherified the resulting ether may be washed directly with water to remove the caustic potash contained therein since the ether is practically insoluble in most caustic potash solutions. This is not possible with the ether made from soda cellulose. The use of the caustic potash therefore obviates the necessity of neutralizing the caustic alkali in the ether with an acid which makes it impossible to recover the alkali. On the other hand the caustic potash solution washed from the ether may be evaporated to mercerizing strength and again used. Last traces of caustic potash in the ether may be neutralized by means of an acid.

I have found that if the alkali cellulose, mercerized as previously described and then subjected to ethylene oxide or homologous oxides at temperatures below charring and preferably at or about room temperatures, in an amount which does not give a product completely soluble in caustic soda solution, is then refrigerated until the caustic soda solution freezes, the product becomes more soluble or completely apparently soluble. The insoluble fibers have been so modified by the etherification process that they require only the change, perhaps only a mechanical disintegration, produced by freezing to disperse and render them apparently and effectively soluble in the caustic soda solution. In this way I may make a product practically completely soluble in dilute caustic soda solutions (5% to 15%) although containing only about 7% to 8% of ethylene oxide based on the weight of cellulose used. As an example, an ether containing 8% ethylene oxide, when subjected to the action of 12½ times its weight of 8% caustic soda, showed 34.1% insoluble in 24 hours at room temperature. A similar mixture when subjected to a temperature of —20° C. for the same length of time showed but 1.20% insoluble. This indicates that one ethylene oxide unit combines with four units of cellulose to form ethyleneglycol (tetra) cellulose or tetracellulosehydroxyethyl ether in which compound the oxide is in the proportion of 6.8% of the cellulose content. With less than this amount of oxide a more or less cloudy solution is formed, even when the ether is dispersed by freezing, showing that a portion of the cellulose ether compound or reaction product is insoluble. I have, however, made reaction products containing as low as 3.5% added ethylene oxide which, with freezing, are largely soluble in a 10% caustic soda solution. Such solutions containing undissolved cellulosic materials in suspension may be technically useful and are within the scope of my invention. As another example, an ether containing 12% to 14% of added ethylene oxide may appear completely soluble to the eye but contains dispersed particles sufficiently large to prevent making a product of the highest degree of transparency. A freezing operation will further disperse these particles to produce a solution which yields films of the highest transparency.

The compound formed which contains less than 13.6% of added oxide necessary for the ethyleneglycol (di) cellulose ether and especially the compound containing less than 10% of added oxide or more than about 3 units of cellulose has many desirable properties. The cellulose compound of ethylene oxide of these proportions which, when thrown out of solution when the alkali solution reacts with an acid or other precipitating agent, is tougher and stronger than one which contains a higher percentage of oxide. It gives a film which is flexible and may be stretched without the addition of glycerine. The superior physical properties of the product indicate that the cellulose has undergone little degradation. It furthermore makes possible the use of various chemical wood pulps for the manufacture of high grade films and filaments now only possible when made with specially prepared wood pulp or cotton linters.

Films and filaments and the like may be made from the hereinbefore described ethers containing an ethylene oxide content up to 20%. If the added ethylene oxide is in excess of approximately 20% of the weight of cellulose in the alkali cellulose the films and filaments become softer and slimier when wet. The greater the excess of oxide the more pronounced these characteristics become. Furthermore, with increased alphyl content the product tends to become more soluble or entirely soluble in caustic potash solutions, very dilute caustic alkalies and water. This ordinarily is not desirable. I therefore prefer making a compound that consists of substantially less than about one molecular weight of ethylene oxide to one unit of cellulose, and containing usually less than 20% of added ethylene oxide. This applies also to the compound whether made with ethylene oxide or ethylene chlorhydrin.

When making films and filaments and the like the ether is dissolved in a caustic soda solution, a weak caustic soda solution of about 2½% to 3% strength being used for an ether of about 20% added ethylene oxide content and about 5% caustic soda for one which has had to be frozen in order to make all of the ether soluble. Sufficient caustic soda solution may be used to produce a solution containing any desired amount of cellulose ether, the ether concentration usually being from 6% to 8% or 9%.

The solution is usually clear, but as a precaution may be filtered to remove whatever dirt or other solids, or undissolved matter that may be present. Its viscosity may be made such that it is capable of being extruded from dies into a number of forms, such as films or filaments, continuous tubing, or made into bottle caps, insulating goods, and the like. It may be extruded into a coagulating bath similar to that employed in the manufacture of films, filaments, and the like from viscose, namely, of the approximate composition: 10% sulphuric acid, 20% sodium sulphate and the usual organic compounds such as glucose, and inorganic salts such as zinc sulphate, magnesium sulphate, etc. The product sets into a transparent, non-fibrous, solid substance which, after washing in water has a good wet and dry strength. Threads and sheets made from the new product possess good physical properties. The films or filaments so made are clear and uniform in color, often do not require bleaching, are hard and firm in texture, and possess good tensile strength.

Following is an example in which refrigeration is used. The cotton linters or chemical wood pulp are mercerized in the usual manner as hereinbefore described. The excess caustic alkali is removed as described. The alkali cellulose is exposed to the desired amount of ethylene oxide— say not more than 6.8% to 10%—until the oxide is absorbed. Water is added to this product until the strength of the caustic soda solution (the cellulose ether not included) is reduced to 2% to 10%, preferably 4% to 6%, the optimum being about 4.75%. Caustic soda solutions of 2% to 10% strength start freezing at from —0.3° C. to —10° C. If sodium chloride or other salts are present in the caustic soda solution the percentage varies accordingly from those given. The mixture is refrigerated to such a temperature that a mass of crystals of ice form and preferably until the caustic soda solution freezes. Although the water starts freezing and ice separates from a solution containing less than 20% caustic soda the residual caustic soda solution itself does not freeze until a concentration of 20% is reached. A 20% caustic soda solution freezes at —20° C. This temperature is the most effective. Lower temperatures may be used. Long exposure to these low temperatures is not harmful to the product. The frozen mixture has a cheesy consistency and contains ice crystals and hydrated caustic soda crystals if the temperature is maintained at —20° C. or lower. The mass is allowed to melt and come to room temperature. If necessary more caustic soda is added, and preferably to the melting mass to prevent gelling at room temperature, since the ether containing 7% ethylene oxide requires at least a 6% caustic soda solution to produce complete solubility. The higher ethers permit the use of weaker caustic soda solutions. The compound of cellulose and ethylene oxide or homologous oxides on melting is transformed into a syrupy solution in the caustic soda. This solution, when made under the optimum conditions, is practically free from insoluble cellulosic materials and may be treated in much the same manner and used for many of the same purposes as the product obtained when 13% to 20% of the ethylene oxide is present in the compound.

Its superiority for certain purposes has been discussed previously. Although a specific procedure has been given the amount of ethylene oxide and the refrigerating temperatures may be varied over a wide range to secure specific products without departing from the scope of my invention. Refrigeration sometimes may be used to advantage for products containing a high percentage of oxide of a small amount of insoluble cellulosic material remains after dissolving the reaction product in a caustic soda solution.

In the above example in which refrigeration is used the cellulose is mercerized with a 25% to 30% caustic soda solution, and then squeezed to remove excess caustic solution. After etherification when water is added to decrease the caustic soda concentration to about 4.75% for the freezing operation, the ether concentration in the final solution is too low (about 5% to 6%) for many purposes. The preferred procedure which may be used to increase this ether concentration, and which decreases the amount of material which has to be frozen, is to remove about ⅓ of the reaction product after etherification before dilution with water, and neutralize the alkali with acid. The ether is then washed and is added to the balance of the reaction product. The entire mass is then diluted with water to reduce the caustic soda solution strength to 4.75%. It is then frozen, after which it is thawed with proper caustic soda addition. This produces an ether concentration of 8% to 8.50% which is desirable for many purposes. If desired the entire reaction product may be first acidified, washed, and then frozen in caustic soda solution.

Although caustic soda is the specific caustic alkali specified during the refrigerating operation it is possible to use caustic potash solutions though the concentration limits are narrower. It is possible by the refrigeration method to increase somewhat the very limited solubility in dilute caustic potash solutions (10% to 25%) of the ethers containing a low percentage of hydroxy-ethyl radical. These ethers which show an increase in their very limited solubility in dilute caustic potash solutions after freezing, do not retain this increase in solubility after being again precipitated from caustic alkali solution, unless subjected to refrigeration again. These results are similar to those obtained when caustic soda solutions are used.

It is also possible to remove small amounts of insoluble reaction product from hydroxy-ethers containing a low percentage of hydroxy-alphyl radical by dissolving the etherified reaction product in a dilute caustic soda solution (about 6% to 10%) and filtering off the small amount of insoluble matter. The ether concentration, however, must be low to filter the solution. As this procedure results in a solution of ether too dilute for most purposes it is necessary to evaporate off the excess water or to precipitate the ether from it. After precipitation and washing it is redissolved to the desired concentration in caustic soda solution. Refrigeration may be used to aid solution. This method has too many disadvantages for practical purposes and also tends to degrade the cellulose, thereby increasing the solubility of the final ether in caustic alkalies.

It is possible also to react the ethylene oxide with cellulose directly with or without a catalyst as has been previously known in the art, and then refrigerate these products with caustic soda solutions, thereby rendering soluble, or increasing the solubility of, those compounds of ethylene oxide and cellulose which have been regarded as insoluble in caustic soda. I have treated wood pulp with 12% of ethylene oxide, using a temperature of 100° C. and pressure, in the absence of alkali, producing a product insoluble in dilute caustic soda solutions at room temperatures. The entire reaction product was then frozen in a dilute caustic soda solution and on melting the solubility of the product in dilute caustic soda solution seems to have increased, judging by the increase in the amount of gel-like material.

I am able by my improved process to make those compounds which are lowest in cost and most useful in the arts and which apparently were not produced by the processes heretofore known. Those compounds which were not previously produced and which are most valuable are those which are insoluble in water and practically or almost insoluble in dilute caustic potash solutions, and which have a limited partial solubility in dilute caustic soda solutions as hereinbefore described, and which contain substantially less than one molecular weight of olefine oxide in combination with one unit of cellulose ($C_6H_{10}O_5$), and especially those containing less than one molecular weight of oxide to two units of cellulose.

Although hydroxy-alphyl ethers of cellulose have been made by reacting upon wet alkali cellulose with a halohydrin of a polyalcohol the ethers resulting from that reaction have been described as being easily soluble in aqueous caustic alkalies and as being derivatives in which at least one hydroxyl hydrogen atom of the cellulose is replaced by an hydroxy-alphyl group. The relatively large amount of ether-forming compound thus introduced into the cellulose molecule by the above method apparently resulted in the production of derivatives which showed a high solubility in the caustic alkalies. Such compounds are of little commercial importance. I have found that it is not necessary to use the halohydrin since I apparently can produce the same compounds by utilizing the gaseous oxides which result when the halohydrin reacts with caustic alkali. I also have found that it is possible to apply the refrigeration principle to the cellulose derivatives formed by treating the alkali cellulose with the halohydrin.

Olefine chlorhydrins, such as propylene and ethylene chlorhydrins, and glycerol monochlorhydrin, also known as alpha monochlorhydrin, may be used to produce the hydroxy-alphyl ethers. The glycerol oxide corresponding to the glycerol monochlorhydrin is very difficult to make and therefore is not at present of importance for the commercial production of the dihydroxy-propyl ether of cellulose. If hydroxy-ethers are to be produced which have substantially less than one hydroxy-alphyl radical per cellulose unit I have found that good results can be obtained by using these chlorhydrins in practically dehydrated condition. It is also better to use a stronger caustic alkali solution for mercerizing the cellulose. Instead of using the 30% solution which I prefer with the ethylene oxide method I prefer using about a 40% caustic soda solution. If the commercial ethylene chlorhydrin, which contains about 60% water, is used, the results may be unsatisfactory and the reaction incomplete. A large amount of cellulose apparently remains unacted or only slightly acted upon by the chlorhydrin. The derivatives made by using the chlorhydrins and containing a large proportion of cellulose to the ethylene oxide or hydroxy-alphyl content, that is, from two to four cellulose units to one of the oxide, contain a certain amount of cellulose reaction products which are insoluble in a dilute caustic soda solution and it becomes necessary to freeze the solution as previously described to make these insoluble products more soluble. The soda cellulose after being treated with the chlorhydrin contains not only the hydroxy-ether and the insoluble particles of cellulose compound but also the sodium chloride which is formed by the chlorine in the chlorhydrin. This mixture may be frozen directly without the removal of the sodium chloride or the mixture may be neutralized, washed to remove the sodium chloride, and then frozen. These procedures will be further illustrated in specific examples.

Using cotton linters as a base the viscosity of the product when dissolved in dilute caustic alkalies often becomes excessive for ordinary purposes. I find that this viscosity can be reduced and the tendency to solubility in water increased to any desired extent without changing the concentration of the solution, by ageing the alkali-cellulose before etherification or by ageing the unwashed and undried etherified alkali-cellulose before solution, or even by simply ageing the resulting alkaline solution of the ether. Higher temperatures in ageing produce a lower viscosity, and increase the solubility. Excessive lowering of viscosity may result in derivatives that produce weak films or filaments. Higher temperatures in the etherification do not appreciably increase solubility. There seems to be no direct relation between viscosity and solubility, but depolymerization of the cellulose both lowers viscosity and increases solubility. Higher proportions of oxide lower viscosity and increase solubility.

As mentioned heretofore, I may use cellulosic material other than cotton linters. Cotton linters are probably the least depolymerized form of cellulose obtainable. If a more depolymerized form such as chemical wood pulp is used, the ether obtained is made water soluble more easily, the solubility increasing with the extent of depolymerization of the raw cellulosic material. However, even depolymerized celluloses such as artificial silks, consisting of cellulose regenerated from viscose solutions, form water insoluble products if treated with moderate amounts of ethylene oxide in the presence of caustic alkali. Such cellulose (without mercerizing) forms water soluble products with ethylene oxide directly if heated with an excess of oxide at 100° C. for a number of hours, whereas the same treatment with cotton linters or wood pulps results in a product which cannot be distinguished from the original cellulose except that it is only slightly more reactive (e. g. to esterification) but it is not soluble in water, caustic soda, or organic reagents at ordinary temperatures. The etherifying action which occurs when the oxide reacts with the alkali cellulose therefore must be different than when the oxide reacts directly on the cellulose. There are many practical industrial applications for a water soluble product, in a dry fibrous form or in aqueous solution. Some of the uses to which it is applicable are: size for textiles, adhesives, filler for adhesives, base for explosives, etc.

The formation of a water soluble product from alkali cellulose depends on the kind of cellulose (wood cellulose, hydrocellulose, etc.) and the ageing of the alkali cellulose, or ether solution, etc. as previously explained. The process for producing the soluble product from ordinary pulp is simple. The raw cellulosic material such as chemical wood pulp is mercerized to obtain alkali cellulose, allowed to stand for 24 hours in limited contact with air, and etherified with a large amount (75% to 90% or more) of ethylene oxide as above described. The oxygen of the air oxidizes the cellulose and renders it more easily dispersible. In permitting contact with air the material is best maintained in a loose fluffy condition in a container having a loosely fitting cover through which air may enter. Further standing in contact with excess alkali may be necessary. To form the dry, fibrous product, the impure ether is neutralized with a suitable acid, washed with alcohol, and dried. To form the aqueous solution the impure ether is dissolved in water or caustic alkali solution. It then may be neutralized with suitable acid such as acetic acid, and the resulting salts may be washed out with an organic solvent such as alcohol, or may be removed by dialysis or by drying the neutral product and leaching the salts therefrom with a non-aqueous solvent. After the salts are removed, the material may be dissolved in water and the viscosity of the solution may be regulated to any desired value. Such material is valuable as an adhesive, either alone or with sodium silicate, and may also be used as a filler for inks or other similar materials as enumerated above.

The advantages of my process over the viscose process for the manufacture of films, filaments, etc., lie in obtaining more stable cellulose solutions and products which require neither desulphurizing nor bleaching. An additional advantage is realized by re-dissolving waste and scraps in a caustic alkali solution and using it for any desired purpose for which a fresh solution may be used. Furthermore no odors nor poisonous gas are liberated by the coagulating bath. Viscose must always be fashioned into its final form after a period of carefully controlled ageing whereas my ether, once purified and freed from caustic soda, may be stored indefinitely in the dry state, or in water if a mold preventive, such as formaldehyde, is present. It may be used at any time. In the presence of dilute caustic soda solution, the solution shows relatively little change with age as compared to similar viscose solutions. Of course, either product may be stored safely if refrigerated. Furthermore, the sodium cellulose xanthate, of which viscose is comprised, is unstable and is subject to spontaneous decomposition, whereas my product is relatively stable and suffers only a slight drop in viscosity while ageing in dilute caustic soda solutions. A further advantage of my product lies in the ease and simplicity with which the washing of the coagulated product is accomplished. Washing in water is all that is required, whereas in the case of viscose, the large quantities of sulphur in the impure coagulated product must be eliminated and a number of washing and bleaching operations must be performed.

The ethylene oxide or other olefine hydrocarbon oxide may be dissolved in benzol or some other non-reactive organic solvent and this solution used to react with the alkali carbohydrate. A specific illustration is given hereinafter as Example V.

Although I prefer to use the etherifying agent in the vapor phase, I may use it in its liquid phase as well as in a solution. Example VI given hereinafter illustrates the use of an oxide in its liquid form.

The compounds of cellulose and propylene oxide, butylene oxide, and amylene oxide, may be prepared in a manner similar to the method used for the preparation of the ethylene oxide compound with due regard to the slight differences in the physical and chemical properties of these oxides. The slight differences in manipulation necessary will be understood by those skilled in the art. The resulting compounds have those differences in their properties as are to be expected in a series of such compounds. If propylene oxide is used as the etherifying agent, the following example shows how it may be used without freezing. The carbohydrate such as cellulose is treated with alkali by steeping and then removing the excess as hereinbefore described for etherification by ethylene oxide. The resulting alkali cellulose is then treated with a measured amount of propylene oxide (boiling point 35° C.) in a closed container at about 35° C. to 40° C. In a specific instance when 12.6% of propylene oxide was absorbed, the reaction product as a 6% solution of ether in dilute caustic soda, resulted in a translucent syrup containing many undissolved fibers; at 17.6% there was increased solubility but many undissolved fibers; at 22.4% most of the fibers were soluble in a caustic soda solution which could be filtered to a clear solution; and at 28.3% there was perfect solubility. The end product is an hydroxypropyl ether of cellulose. The 12.6% propylene oxide compound may be frozen to form upon melting a practically perfect solution in dilute caustic soda. The properties of the caustic soda solution of this compound are very similar to those of the corresponding ethylene compound, and the films coagulated therefrom are comparable to those made from the ethylene compound. The ethylene and propylene compounds may be mixed or formed by the mixed oxides and sometimes used to advantage to replace the separate compounds.

When using chemical wood pulp instead of cotton linters to produce ethyleneglycol (di) cellulose ether or the other compounds containing a higher proportion of the etherifying reagent, I prefer to steep the sheets of pulp in about 15 parts of 18% to 25% caustic soda solution, and then squeeze to form an alkalicellulose containing from 25% to 35% cellulose. This alkali cellulose is then etherified in a closed container with ethylene oxide at room temperature. If ethyleneglycol (di) cellulose ether is desired about 14% of the oxide based on the cellulose content is used. The balance of the procedure is the same as before. Films and filaments made from the wood pulp compound are weaker when wet than a similar compound made from cotton linters.

If compounds of the carbohydrates not of a cellulosic nature are to be formed, the procedure which is followed is similar to that used with cellulose, giving due regard to the differences in the chemical and physical properties of these compounds. Such carbohydrates may be starches, sugars, such as cane sugar, glucose, etc., and include such carbohydrate derivatives as contain hydroxyl groups that are reactive with ethylene oxide. These materials after treating with alkali react with ethylene oxide and propylene oxide and other oxides of the olefine series with great vigor. The large amount of heat liberated readily produces a sufficient rise in temperature to cause charring if the reacting materials are not cooled. A large excess of ethylene oxide renders the product soluble in alcohol. Glucose and cane sugar and other similar carbohydrates may be etherified in a like manner to starch. Refrigeration may be used with the starch as with cellulose but there does not appear to be any advantage gained because all of the products are water soluble, including the alkali starch.

Throughout the specification "etherification" has been used to denote the reaction in the presence of alkali between the carbohydrate and the reacting oxide, or chlorhydrin. The product resulting from the addition of suitable alkali to the various carbohydrates is called "alkali carbohydrate" and in the case of cellulose "alkali cellulose". The final product also has been called an ether although the definite structure of the product is not known.

It is probable that the cellulose ethers made according to my invention are hydroxy-alphyl ethers of cellulose. Those ethers made by reacting the alkali cellulose with ethylene oxide or ethylene chlorhydrin are probably hydroxy-ethyl ethers of cellulose, those made by reacting the alkali cellulose with propylene oxide or propylene chlorhydrin are hydroxy-propyl ethers of cellulose, those made by reacting alkali cellulose with glycerol monochlorhydrin are dihydroxypropyl cellulose ethers.

Throughout the specification I use the term "alphyl" as indicating a radical of the aliphatic series inasmuch as the term "alkyl" which is sometimes used to make this distinct reference is frequently indicative of both aliphatic and aromatic radicals. The term "alphyl" is specific to the aliphatic series in the same manner as "aryl" is specific to the aromatic series. See Richter's Organic Chemistry, Vol. I, page 43, first English Edition, 1916. The term "caustic alkalies" so far as I have reduced the invention to practice refers only to the hydrates of sodium and potassium, but in the claims would not exclude the use of hydroxides of other monovalent alkali metals.

Although my process may be applied to carbohydrates in general its greatest importance at present seems to be in its application to those carbohydrates that are polysaccharides, especially cellulose. By carbohydrate I refer especially to the natural sugars, starches, and celluloses, and substances related to them. These polysaccharides may contain two or more units of $C_6H_{10}O_5$. The cellulose molecule which has not been depolymerized, may contain four such units and my experiments indicate that four or possibly more of such units will combine with one or more ethylene oxide molecules to form a compound soluble in dilute caustic soda solution (5% to 15%). The carbohydrates like glucose, which, on the other hand, consist of one such unit, probably united in equi-molecular proportions with the oxide.

It is to be observed that in the process of carrying out the reactions of this invention it may be difficult to control the reaction so that every unit of carbohydrate is similarly combined with an oxide molecule. Some units of carbohydrate may be deficient in and others may be oversupplied with the oxide, while the average aggregate and the greater percentage of all the aggregates may be similarly combined. Therefore in the appended claims it is contemplated that the products claimed are not composed entirely, but only predominantly, as specified. Whenever the percentage of olefine oxide or alphyl radical is specified, it refers to the added amount rather than the actual amount. This is necessary because of the difficulties encountered in analyzing the reaction products to determine their exact constitution.

Whenever a reference is made to olefine oxides containing an ethylene oxide group it is intended to cover these oxides in which the oxygen is linked to two adjacent carbon hydrogen groups thereby forming an ethylene oxide group within the olefin. Whenever a non-substituted olefin oxide is referred to this does not cover the homologous oxides of the series. Propylene oxide may, for example, be called methyl ethylene oxide and may possibly be regarded as a substituted oxide but by me it is not so regarded.

The following specific examples of the invention are given by way of summarizing the invention in its various modifications. Other modifications are contemplated by the appended claims.

Example I

*Cellulose-ethylene oxide water insoluble compound suitable for films, filaments, etc., containing 20% ethylene oxide based on original cellulose*

100 parts by weight (dry weight) of cotton linters are thoroughly stirred into 1500 parts by weight of 30% caustic soda solution. After stirring for several minutes to insure thorough wetting of the linters by the caustic soda solution, the linters, now changed into alkali cellulose, are passed through squeeze rolls to remove the excess caustic soda solution and to increase the cellulose content of the mixture to about 30%. The mixture after shredding is a wet, fluffy, fibrous mass. It usually is not allowed to age more than 24 hours at about 20° C. It is put into a tightly closed reaction chamber in which stirrers keep the alkali cellulose thoroughly agitated. Cooling means on the exterior of the reaction chamber may be necessary if the etherifying action is too violent. It is preferable to evacuate the reaction chamber prior to the introduction of the oxide as this hastens the reaction and allows the reaction to proceed more uniformly throughout the alkali cellulose. While the alkali cellulose is being stirred vigorously about twenty parts of gaseous ethylene oxide are admitted at a rate which does not allow the reacting mass to go over a temperature of 100° C. For the best results the temperature is kept below 45° C. The resulting product is still fluffy and retains the physical megascopic form and structure of the linters. This product then may be processed in two ways:

(A) To neutralize the excess caustic soda, it may be treated with a dilute acid, preferably hydrochloric or sulphuric of about 5% to 10% strength. If the fibrous compound is stirred into the acid vigorously, local formation of gel spots may be prevented and the resulting product retain the fluffy fibrous forms of the fibrous linters. After the caustic soda is neutralized the product consists of the cellulose-ethylene oxide compound, hydroxy-ethyl cellulose ether. It may be washed with water to neutrality and then dried. The resulting product still retains its fibrous, fluffy condition and may be kept indefinitely. It may be dissolved in dilute caustic soda solution at any time and utilized as described in the following paragraph (B).

(B) The fluffy alkaline cellulose-ethylene oxide product is stirred into water so that the cellulose concentration is from about 5½% to 8% (based on the original weight of air dry cellulose used). There should be enough caustic soda present in the product so that the diluted solution contains at least 2% and preferably 2½% of caustic soda. If the concentration is below this enough caustic soda is added to bring it up to the desired amount. The cellulose compound forms a clear viscous solution in the dilute caustic soda. This solution may be filtered to remove any undissolved impurities. If the solution is too viscous for the next operations it may be aged to reduce this viscosity without decreasing the cellulose concentration. This solution is then passed through suitable dies or formed on suitable shapes to make films, filaments and other products. It then is passed directly into an acid coagulating bath such as 5% sulphuric acid which may contain 15% of sodium sulphate. The caustic soda is neutralized forming a film, filament or other article of water insoluble cellulose-ethylene oxide or cellulose hydroxy-ethyl ether gel. The gel is washed with water and dried. Other operations may be carried out on the formed gel before drying depending upon the use to which it is to be put. Fillers and pigments may be incorporated in the viscous alkaline solution if desirable.

Example II

*Making compounds containing 7% of ethylene oxide using refrigeration*

(A) Sheets of chemical wood pulp high in alpha cellulose are used as the raw material in this case. Sufficient wood pulp is taken so that it contains 100 parts by weight of dry cellulose. The sheets of wood pulp are mercerized in the 30% caustic soda solution in the same manner as given in Example I. After squeezing the excess caustic soda from the wood pulp it is shredded into a fluffy mass. As in Example I, the alkali cellulose is put into a tightly closed reaction chamber in which it is stirred vigorously, while about 7 parts by weight of gaseous ethylene oxide are admitted to the chamber. After the ethylene oxide has reacted completely with the alkali cellulose the reaction mass is removed from the reaction chamber. This product may be dissolved in a caustic soda solution of at least about 6% strength. It contains some undissolved cellulosic products which may not be objectionable for certain purposes, as in certain coating operations. The undissolved cellulosic materials may be made practically entirely soluble by the refrigerating operation to be described. Enough water is added to the reaction mass to bring the caustic soda solution strength down to about 4.75%. The entire mass is now refrigerated until it freezes, usually at a temperature of about −20° C. The frozen mass is removed from the refrigerating chamber and allowed to melt. Enough caustic soda is added prior to melting to produce a final 6% caustic soda solution. The solution which results is clear and viscous.

(B) The concentration of cellulose ether in the final solution produced in (A) is not high enough to make it suitable for the production of films, filaments, and the like. To bring the ether concentration to the desired amount for the production of films and filaments, usually about 8%, the procedure is modified somewhat. After the etherification is completed, about one-third of the ether reaction mass is removed and neutralized by adding a 5% to 10% solution of hydrochloric or sulfuric acid. The neutralized ether is washed free of salts after which it is returned to the two-thirds portion which was not treated with acid. The entire mass is then diluted with water to bring the caustic soda concentration to 4.75% as in (A). By this procedure the concentration of ether with respect to the caustic soda solution is increased to the amount necessary to give the desired final concentration. The entire mass is now refrigerated and melted as described in (A). The resulting clear viscous solution which results may be manipulated as described in Example I, Section (B) to produce films, filaments and other pyroxylin-like objects. The cellulose-ethylene oxide compound formed when coagulated out of the caustic soda solution is not as readily soluble in caustic soda solutions as that formed in Example I.

EXAMPLE III

*Making compounds containing 12% of ethylene oxide suitable for films of highest transparency*

The procedures as given in Example II are followed except that 12 parts by weight of ethylene oxide are used and a high grade pulp is used such as is suitable for the viscose type of artificial silk known as rayon. After refrigeration the product may be dissolved in a weaker solution of caustic soda compared to the 6% caustic soda solution needed to dissolve the compound containing 7% of ethylene oxide given in Example II. A 4% to 5% caustic soda solution is sufficient.

EXAMPLE IV

*Making water soluble compounds from wood pulp and ethylene oxide*

The alkali cellulose is made as described in Example II. After the excess caustic soda solution is removed from the wood pulp it is allowed to stand in limited contact with the air for a period of about 24 hours or more. This may be accomplished by putting the alkali cellulose in a container which does not have a tight fitting cover, thereby also preventing excessive carbonation of the alkali. The alkali cellulose is then etherified with a large amount of ethylene oxide. 75% to 95% or more ethylene oxide, depending on various factors, is used, this amount being based on the amount of cellulose used in the form of pulp. The resulting compound may now be dissolved in water. The alkali may be neutralized with a mineral acid, such as hydrochloric or sulphuric. Coagulation does not take place. The salts of hydrochloric and sulphuric acid which are formed when the caustic soda is neutralized by these acids may be removed from the compound by dialysis. If acetic acid has been used to neutralize the caustic soda then the resulting sodium acetate may be removed by treating the entire mass with alcohol. Since the sodium acetate is soluble in alcohol this effects a separation from the cellulose compound.

EXAMPLE V

*Etherification with ethylene oxide dissolved in solvents*

The alkali cellulose is prepared as described in either Examples I or II. A 20% solution of ethylene oxide in benzol is made. The wet alkali cellulose is submerged in the benzol solution of ethylene oxide for 48 hours at a temperature of about 4° C. after which the excess of benzol and oxide is removed as by centrifuging or distillation. The resulting compound of cellulose and ethylene oxide is soluble in weak caustic soda solutions and is treated as described in Example I to form other products therefrom. The etherification of alkali cellulose apparently takes place much more slowly in the liquid phase than in the vapor phase.

EXAMPLE VI

*Etherification with liquid ethylene oxide*

The alkali cellulose is made as described in Example I. The wet alkali cellulose after squeezing out the excess of caustic soda is submerged in liquid ethylene oxide. After being submerged in the liquid for a period of 20 hours at 4° C. it is removed and the excess ethylene oxide driven off by warming. The resulting product is soluble in dilute caustic soda solutions and may be coagulated as described in Example I and used for various purposes. If it is desirable to increase the temperature so as to cut down the time of etherification pressure vessels must be used.

EXAMPLE VII

*Making compounds containing 12.4% of propylene oxide*

The alkali cellulose is made as is described in Example I. About 100 parts by weight of fluffy fibrous alkali cellulose is introduced into the reaction chamber. The reaction chamber is evacuated after which the requisite amount of propylene oxide vapor is introduced into it. About 12.4 parts by weight of propylene oxide are used. Since the propylene oxide boils at 35° C. it is desirable to keep the reaction chamber at that temperature or slightly higher if evacuation is not used. After the propylene oxide has been completely absorbed by the alkali cellulose the resulting product resembles that after etherification described in Example II. The procedure for isolating this compound and using it in the various forms follows the procedure outlined in Example II. Compounds containing varying amounts of propylene oxide may be made according to the procedures outlined in Examples I, III, IV, V and VI, having due regard to the differences in the two compounds.

EXAMPLE VIII

*Making compounds of starch and ethylene oxide*

About 100 parts by weight of ordinary corn starch, containing 10% of moisture, is mixed with about 200 parts by weight of 20% caustic soda solution. The mixing must be thorough until the reaction is completed. The alkali starch is then introduced into the treating cylinder with more agitation and treated with the ethylene oxide. The ethylene oxide is absorbed by the alkali starch. About 15 to 17 parts by weight of ethylene oxide gives a water soluble, translucent compound that is doughy but sticky in consistency. The excess caustic soda may be dialyzed from the water soluble starch compound. Acetic acid may be used to neutralize the excess caustic soda and the resulting sodium acetate separated from the carbohydrate compound by ethyl alcohol.

EXAMPLE IX

*Making cellulose hydroxy-ethyl ether using ethylene chlorhydrin*

Method A:—The wet alkali cellulose, made as described in Example I, is introduced into a tightly closed reaction chamber having a stirrer and a false perforated bottom. Into the chamber underneath the false bottom, equal parts of a 20% caustic soda solution and ethylene chlorhydrin of specific gravity 1.15 are introduced. Enough of the two solutions are used to generate about 20 parts by weight of ethylene oxide. The bottom of the reaction tank is then warmed so as to generate the ethylene oxide more quickly. After the ethylene oxide is completely evolved and has reacted with the alkali cellulose the resulting compound of cellulose and ethylene oxide is removed from the reaction chamber. This compound is similar to that obtained in Example I and the balance of the procedure is the same as that given in Example I.

Method B:—In this method the ethylene oxide is generated by the caustic soda used to mercerize the cellulose, enough caustic soda solution remaining in the alkali cellulose so that it will react with the ethylene chlorhydrin to form ethylene oxide. Two pounds of wood pulp are wet with 12 parts by weight of 20% caustic soda solution at about 22° C. for a few minutes and only the excess is drained off to leave a soaked alkali cellulose weighing 7 to 9 times the air dry weight of the cellulose. The alkali cellulose is then introduced into a container which may be made tight and refrigerated at about 0° C. for about 30 minutes. Six parts by weight of ethylene chlorhydrin of 1.2 specific gravity are added to the alkali cellulose containing the excess caustic soda solution. The reaction mass is stirred continuously at about —6° C. for one or two hours and then allowed to come to room temperature and stirred at this temperature for 24 to 48 hours. Heating to about 30° C. hastens the reaction. The resulting compound is soluble in dilute caustic soda solution.

Method C:—The soda cellulose is made as in Example I except that a 40% caustic soda solution is used. After squeezing out the excess caustic soda solution the mixture is shredded into a wet fluffy fibrous mass. 100 parts by weight of cellulose are converted into wet fluffy soda cellulose and treated with about 18 parts by weight of anhydrous or nearly anhydrous ethylene chlorhydrin. This amount of chlorhydrin is equivalent to about 9 parts by weight of ethylene oxide. The mixture is stirred vigorously and preferably in a closed container. The temperature may be at room temperature or lower. The reaction is complete within an hour or two. The resulting reaction product may then be diluted with water to bring the caustic soda concentration to about 4.75% NaOH. It may then be frozen as described in Example II. Instead of bringing the caustic soda concentration of the reaction mass to 4.75% it may first be diluted with water to bring the caustic soda concentration to about 6% to 10% after which it is neutralized with an acid. This precipitates the ether, which is washed with water after which it is again wet with 4.75% NaOH and preferably to a concentration of 8.5% ether so that it may be used for the manufacture of films and filaments. The refrigerating operation then proceeds as in Example II.

EXAMPLE X

*Making cellulose dihydroxy propyl ether*

The alkali cellulose is made as described in Method C of Example IX. To 100 parts by weight of the cellulose in the form of wet, shredded fluffy alkali cellulose about 22.5 parts by weight of anhydrous or nearly anhydrous glycerol monochlorhydrin are added and the etherification carried out as described with the ethylene chlorhydrin in Method C of Example IX. This amount of the glycerol monochlorhydrin is equivalent to about 9% ethylene oxide. The balance of the procedure is like that given for the ethylene chlorhydrin in Method C of Example IX. The resulting ether is very similar in its properties to the ether of an equivalent ethylene oxide content whether made from the gaseous ethylene oxide or the ethylene chlorhydrin.

EXAMPLE XI

*Hydroxy-ethyl-cellulose ether benzoate*

100 parts by weight of alpha cellulose chemical wood pulp containing 8.5% moisture is steeped in a 30% caustic soda solution at 18° C. for 45 minutes. The soda cellulose is squeezed to about 350 parts by weight, shredded, and aged 21 hours at 19° C. The alkali cellulose is churned in a closed container 2½ hours with 12 parts by weight of ethylene oxide. The ether is further agitated with 15 parts by weight of benzoyl-chloride for 30 minutes at room temperature in the presence of an excess of benzol. The resulting alkali-ether-benzoate is centrifuged to remove the benzol, dissolved in 4.75% caustic soda, frozen and thawed as in Examples II or III. A 7.5% solution of the resulting compound is made up in 7.5% solution of caustic soda for use in making films, filaments and other products. The process may be reversed, that is, the alkali cellulose may be first benzoylated and then etherified with the ethylene oxide with no appreciable differences in the final product.

The claims of the present application differ from those of the companion applications on this same disclosure in referring particularly to the products herein described. The ethers are claimed broadly so as to include the fibrous product resulting directly from reaction on fibers as described, and so as to include the product formed by coagulation from the solutions described, and such other forms as may be obtained.

This application is a continuation in part of applicant's earlier application, Serial Number 345,214, filed March 7, 1929 and which has since become abandoned. Certain subject matter not claimed in the present application is claimed in my copending applications Serial Nos. 475,249, 475,250 and 475,251, filed August 14, 1930, and in Serial No. 477,752 filed August 25, 1930 as a division of Serial No. 475,249, filed August 14, 1930, which divisional application issued June 14, 1932 as Patent No. 1,863,208. This application also is a division of said copending application Serial No. 475,249, filed August 14, 1930.

I claim:

1. Hydroxy-alphyl ethers of carbohydrates from ethyl to amyl inclusive containing on the average not more than about one alphyl radical to two carbohydrate units.

2. Hydroxy-alphyl ethers of polysaccharides containing less than one ethyl radical to three polysaccharide units.

3. As a composition of matter the reaction product comprising a mixture of caustic alkali and a carbohydrate hydroxy-alphyl ether from ethyl to amyl inclusive, said product resulting from the reaction between an olefine oxide and alkali carbohydrate and containing at most on the average substantially less than one molecule of said oxide per carbohydrate unit, the said caustic alkali in the product including that excess which is contained in the alkali carbohydrate prior to reaction plus that which results from the reaction between said alkali carbohydrate and said olefine oxide.

4. Cellulose hydroxy-ethyl ethers, containing on the average not more than 20% of combined ethylene oxide based on the weight of the cellulose combined with said oxide.

5. As a composition of matter, the fibrous reaction product comprising a mixture of caustic alkali and an hydroxy-alphyl ether of a fibrous cellulose from ethyl to propyl inclusive, said product resulting from the reaction between a corresponding olefine oxide and alkali cellulose, said ether having the same megascopic fibrous structure of the cellulosic material from which it is derived, containing at most on the average substantially less than one molecule of said olefine oxide combined with each cellulose unit, being incompletely soluble in 10% caustic potash solution and much more than twice as soluble in 10% caustic soda solution, and the said caustic alkali in said reaction product including that excess which is contained in the alkali cellulose prior to reaction plus that which results from the reaction between said alkali cellulose and said olefine oxide.

6. Dicellulose mono-hydroxy-ethyl ether insoluble in water, and having characteristically different solubilities in caustic potash solutions and in caustic soda solutions.

7. Hydroxy-alphyl ethers of cellulose containing not more than one alphyl radical to two units of cellulose, said ethers being insoluble in water, and having characteristically different solubilities in caustic potash solutions and in caustic soda solutions.

8. Hydroxy-alphyl ethers of cellulose from ethyl to propyl inclusive which are insoluble in water and at most partially soluble in caustic potash solutions, said ethers containing on the average not less than about two units of cellulose to one alphyl radical.

9. Hydroxy-alphyl ethers of cellulose from ethyl to propyl inclusive which are insoluble in water said ethers being not more than 50% soluble in a dilute caustic potash solution, and containing on the average not less than about two units of cellulose to one alphyl radical.

10. Hydroxy-ethyl ethers of cellulose insoluble in water and at most partially soluble in dilute caustic potash solutions, in the form of films and filaments, said ethers containing not less than about two cellulose units to one ethyl radical.

11. As a composition of matter the reaction product comprising a mixture of caustic alkali and an hydroxy-alphyl ether of cellulose from ethyl to propyl inclusive, said product resulting from the reaction between a corresponding olefine oxide and alkali cellulose, in which not less than two cellulose units are combined with one molecule of said oxide, the said caustic alkali present including the excess which is present in the alkali cellulose prior to reaction plus that resulting from the reaction between said alkali cellulose and said hydrocarbon oxide.

12. Hydroxy-alphyl ethers of cellulose containing one alphyl radical to 3 to 4 cellulose units.

13. Cellulose hydroxy alphyl ethers from ethyl to amyl inclusive insoluble in water and at most partially soluble in dilute caustic potash solutions, containing on the average an amount of combined olefine oxide not greater than the molecular equivalent of 20% of combined ethylene oxide based on the weight of cellulose combined with said oxide.

14. As a composition of matter, a solid transparent hydroxy-ethyl ether of cellulose containing one ethyl radical to 3 to 4 cellulose units.

15. Water insoluble cellulose hydroxy-alphyl ethers from ethyl to propyl inclusive containing one alphyl radical to four cellulose units.

16. Cellulose hydroxy-propyl ethers, containing on the average not more than 22.4% of combined propylene oxide based on the weight of the cellulose combined with said oxide.

17. Dicellulose mono-hydroxy-propyl ether insoluble in water, and having characteristically different solubilities in caustic potash solutions and in caustic soda solutions.

18. Hydroxy-propyl ethers of cellulose insoluble in water and at most partially soluble in dilute caustic potash solutions, in the form of films and filaments, said ethers containing not less than about two cellulose units to one propyl radical.

19. As a composition of matter, a solid transparent hydroxy-propyl ether of cellulose containing one propyl radical to 3 to 4 cellulose units.

20. Cellulose hydroxy alphyl ethers from ethyl to amyl inclusive containing on the average an amount of combined olefine oxide not greater than the molecular equivalent of 20% of combined ethylene oxide based on the weight of cellulose combined with said oxide.

ARLIE W. SCHORGER.